United States Patent [19]

Wada et al.

[11] Patent Number: 4,768,095
[45] Date of Patent: Aug. 30, 1988

[54] APPARATUS FOR PROCESSING IMAGE

[75] Inventors: Ryukichi Wada; Yoshinori Ishii, both of Kyoto, Japan

[73] Assignee: Mitsubishi Denki K.K., Tokyo, Japan

[21] Appl. No.: 26,850

[22] PCT Filed: Jun. 18, 1986

[86] PCT No.: PCT/JP86/00306

§ 371 Date: Feb. 2, 1987

§ 102(e) Date: Feb. 2, 1987

[30] Foreign Application Priority Data

Jun. 26, 1985 [JP] Japan ................................ 60-139489

[51] Int. Cl.$^4$ ........................................... H04N 5/262
[52] U.S. Cl. ..................................... 358/183; 358/22
[58] Field of Search ..................... 358/183, 22, 160; 340/723

[56] References Cited

U.S. PATENT DOCUMENTS

| 4,249,213 | 2/1981 | Imaide et al. | 358/183 |
| 4,569,079 | 2/1986 | Yoshida | 358/183 X |
| 4,673,983 | 6/1987 | Sarugaka et al. | 358/183 |
| 4,712,133 | 12/1987 | Kikuchi | 358/183 X |

Primary Examiner—Howard W. Britton
Assistant Examiner—Victor R. Kostak
Attorney, Agent, or Firm—Takeuchi Patent Office

[57] ABSTRACT

A method and apparatus for a TV receiver in which a frame of TV image signals is stored in the image memory and then read out for display as a still picture. In order to display both still picture and subsequent motion pictures, the image signals sampled with the number of pixels corresponding to the number of addresses in a specified area of the image memory are written in the process of reading out all the addresses of the image memory.

5 Claims, 3 Drawing Sheets

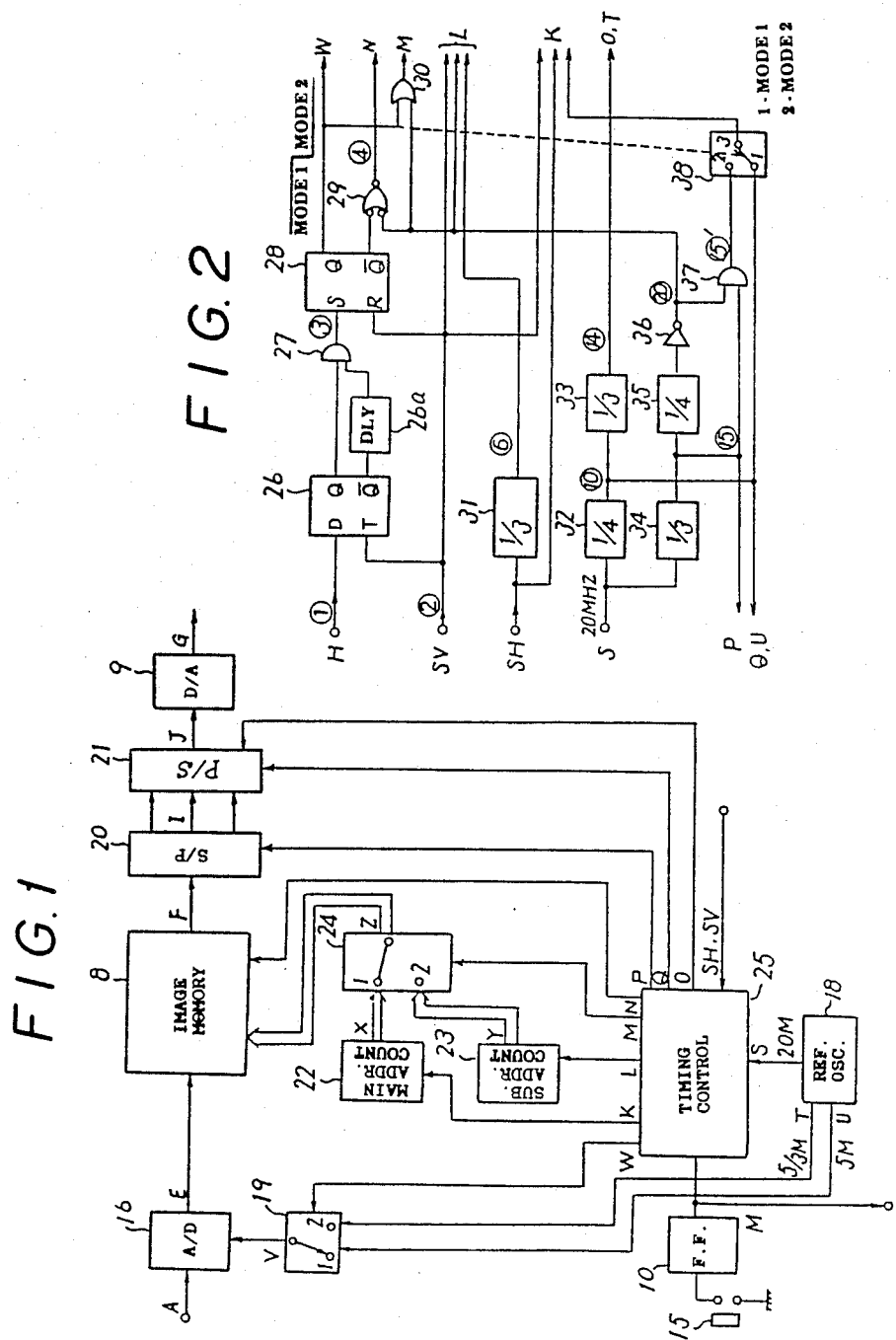

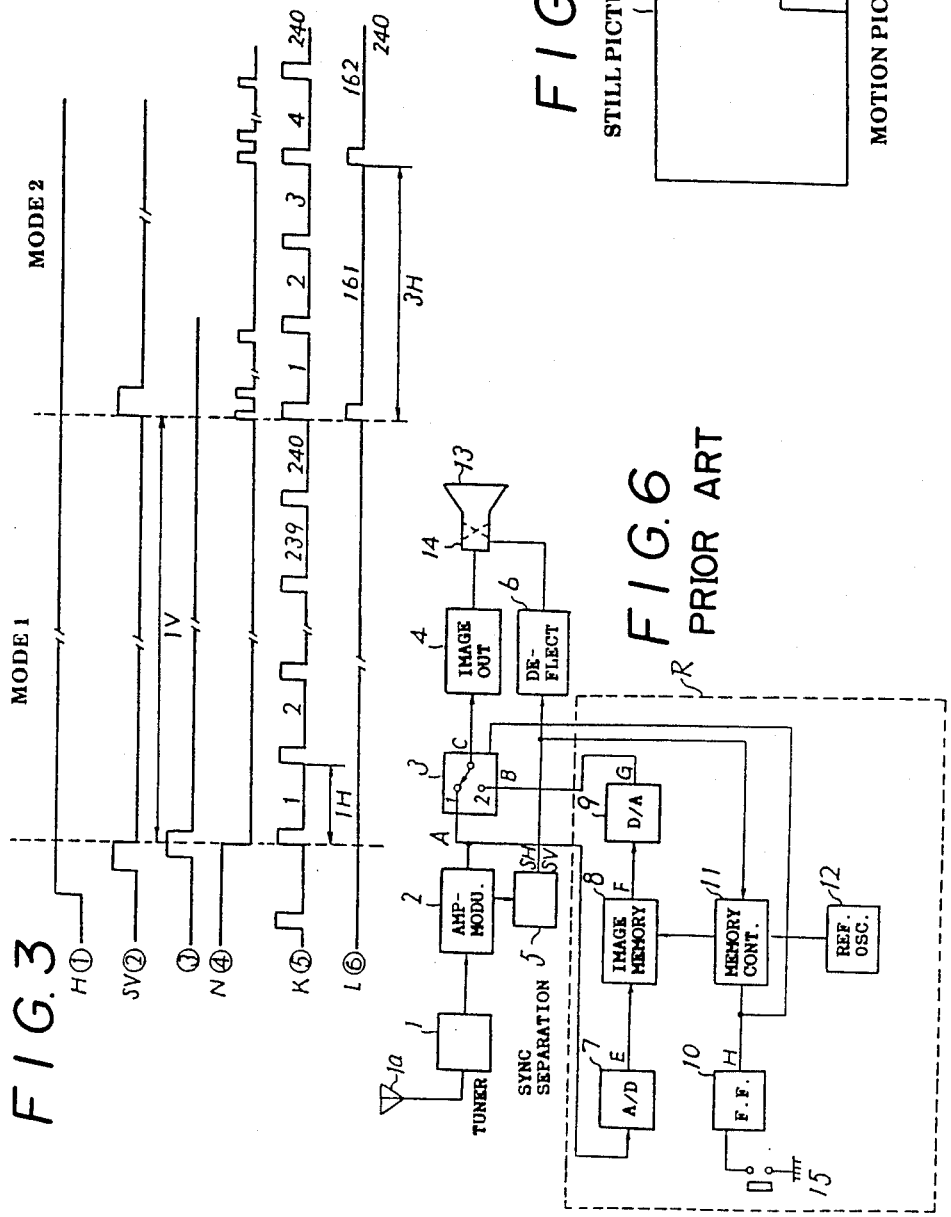

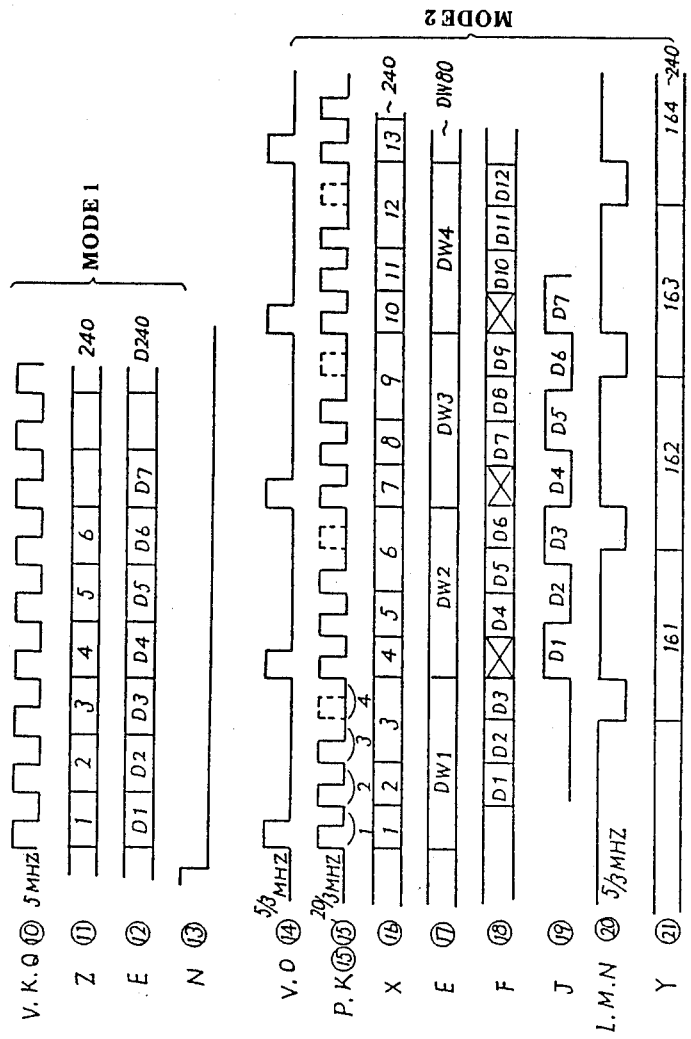

APPARATUS FOR PROCESSING IMAGE

TECHNICAL FIELD

The present invention relates to methods of and apparatus for processing an image, which comprises storing a frame of television image signals in the image memory of a television receiver and reading out the stored signals for display as a still picture.

BACKGROUND ART

The recent advancement of semiconductors and the low costs of memory IC's have made it practical to incorporate into consumer electronics imaging equipment a device for storing a frame of TV image signal in the memory and reading them out for display as a still picture. For example, ordinary TV receivers with such a device can display a given frame of movies as a still picture and can be used for various other purposes. One of the easiest ways to provide such a still picture is the use of a video tape or cassette recorder. With a VTR or VCR, it is possible to pause the playback of a recorded TV program to provide a still picture. However, this method requires the recording, tape rewinding, and playback operations, and it is too troublesome to pause the TV program being broadcast to give a still picture for taking memos for example. It is also not practical to always put the VCR in the recording condition for giving a still picture. Thus, it has been proposed to store TV image signals in an image memory, such as a solid-state memory, from which a still picture is produced by simply pressing the button at the desired scene. Such a device is easy to operate and will find a wide range of applications.

FIG. 6 shows an example of such prior art devices. The desired TV channel can be selected with a tuner 1 from the TV signals received by an antenna 1a and sent to an image amplification and demodulation circuit 2. The demodulated image signal A is supplied through a switch circuit 3 to an image output circuit 4 for driving a display or CRT 13. The demodulated image signal A is also supplied to a synchronization separating circuit 5 to put out horizontal and vertical synchronizing signals SH and SV. These signals are fed to a deflection circuit 6 to generate sawtooth current for driving a deflection yoke 14 of the CRT 13. As a result, a TV picture is displayed on the CRT 13. So far, nothing is different from the conventional TV receiver.

Indicated by a dotted line is an image processing section R for displaying still pictures. The aforementioned demodulated image signal A is converted to a digital signal in an A/D converter 7. In the period of one field or frame after the output H of a flip-flop 10, which is inverted every time a button 15 is pushed, is turned to a high level, a memory control circuit 11 puts out a write signal to an image memory 8 for writing an image signal E in the image memory 8. Upon completion of the writing, the memory control circuit 11 puts out a read signal for reading out the written image signal. This read-out image signal F is converted to an analog signal G in a D/A converter 9 and sent to the switching circuit 3. When the output H of the flip-flop is at a high level, the switch 3 is connected to a point 2 so that the image signal G from the memory 8 is sent to the image output circuit 4 and then displayed on the CRT 13 as a still picture. When the switch 15 is pushed again, the flip-flop 10 is inverted to a low level, which in turn brings the switch 3 to a point 1 for displaying an ordinary TV picture. A reference oscillator 12 supplies operation clocks to the aforementioned memory control circuit 11.

DISCLOSURE OF THE INVENTION

The conventional devices of the above type, however, are not capable of displaying the ordinary TV picture during the time of displaying a still picture. In a VTR, a still picture is produced by mechanically pausing the running of a tape. Consequently, when the still picture mode is released, the subsequent pictures can be viewed without any loss. However, the unit of FIG. 6 loses the TV pictures during the time of displaying a still picture since the TV program is continuously broadcast.

Accordingly, it is an object of the present invention to provide a method of and apparatus for processing an image, which is capable of displaying both still and motion pictures without interruption.

According to the present invention there is provided a method of processing an image, which comprises the steps of sequentially writing in the specified area of an image memory an image signal sampled with the number of pixels corresponding to the number of addresses in the process of reading out all the addresses of the image memory.

In accordance with another aspect of the present invention there is provided apparatus for processing an image, which comprises an image memory; sampling means having a first sampling mode for sampling an image signal at the number of pixels corresponding to the number of all the addresses of said image memory and at a second sampling mode for sampling an image signal at the number of pixels corresponding to the number of addresses in the specified area of said image memory; first addressing means for designating all the addresses of said image memory; second addressing means for designating the addresses in said specified area; and control means for controlling said sampling means, first and second addressing means, and image memory.

According to still another aspect of the invention there is provided apparatus for processing an image, which further comprises a shift register for processing the image data read out of the above image memory in response to the above control means and send its output to the display means.

In the method of processing an image according to the invention, only the specified area of the image memory is used for rewriting so that a motion picture is displayed in the screen corresponding to the above specified area while a still picture is displayed in the rest of the screen.

In the apparatus for processing an image according to the invention, the sampling means can be set in the above first sampling mode by the control means, while the image memory is set in the write mode and all the addresses of the image memory are designated by the first addressing means to write the image for providing a still picture. Upon completion of this operation, the sampling means is set in the second sampling mode while the sampled signals are sequentially written in the above specified area of the image memory by the second addressing means to provide a motion picture. At the times other than this motion picture writing period, the image memory is set in the read mode and the first addressing means is put in operation to read the entire memory contents including both still and motion pictures for displaying them in the display means.

According to still another aspect of the invention, after the entire memory contents including both still and motion pictures have been read out of the image memory, the shift register eliminates the data absent area in the pixel data during the motion picture writing time for display in the display device.

BRIEF DESCRIPTION OF THE DRAWINGS

FIG. 1 is a block diagram of the essential part of an image processing apparatus embodying the present invention.

FIG. 2 is a detailed diagram of the timing control circuit of FIG. 1.

FIGS. 3 and 4 are timing charts for illustrating the operation of the apparatus of FIG. 1.

FIG. 5 shows an example of display in the apparatus of FIG. 1.

FIG. 6 is a block diagram of the structure of an image processing apparatus according to the prior art.

BEST MODE FOR CARRYING OUT THE INVENTION

A preferred embodiment of the invention will be described with reference to the accompanying drawings. In this illustrated embodiment, a motion picture consisting of 80 scanning lines (160 interlaced) each line containing 80 pixels is set in a still picture or main screen consisting of 240 scanning lines (480 interlaced) each line containing 240 pixels, with one ninth of the screen size of the main screen.

FIG. 1 shows in block the essential section of an image processing apparatus centering around the image memory according to the invention. This section corresponds to the image processing section R of the prior art as shown in FIG. 6. The other parts are identical with those of the prior art and will be omitted from FIG. 1. FIG. 2 shows the timing control circuit of FIG. 1 in more detail. FIGS. 3 and 4 are timing charts showing the operation of each section of the above apparatus.

In FIG. 1, an A/D converter 16 constitutes sampling means having first and second sampling modes with different sampling periods. A sampling clock switch 19 is provided to switch between two types of sampling clocks supplied by a reference oscillator 18 to the A/D converter 16. 20 and 21 represents series/parallel and parallel/series conversion shift registers, respectively. A first addressing means or main address counter 22 assigns all the addresses of an image memory 8. A second addressing means or auxiliary address counter 23 assigns the addresses in only a specified area of the image memory 8. An address bus switch 24 switches between the address buses of the address counters 22 and 23 to the image memory 8. A timing control circuit 25 controls the operation timing of each of the above respective parts.

As FIG. 2 shows, the timing control circuit 25 consists of a D type flip flop 26, an RS type flip flop 28, a delay circuit 26a, five logic circuits 27, 29, 30, 36, and 37, five ½ or ¼ frequency dividers 31 through 35, and a signal switch 38. The same alphabets and circled numbers represent the same types but different forms of signals, respectively, throughout in the drawings. In response to the output signal H from the bistable flip flop 10 of FIG. 1, the D flip flop 26 and the R/S flip flop 28 cooperate to generate at the output W a mode-switching signal of high level for the period of one field.

SV and SH are vertical and horizontal synchronizing signals, respectively, put out of the TV synchronization separating circuit 5 in FIG. 6. The frequency of SH is demultiplied to one third in the frequency divider 31. A 20 MHz signal S put out of the reference oscillator 18 is demultiplied to necessary frequencies by the dividers 32 through 35. A signal M is for switching between the main and auxiliary address counters 22 and 23 and, at high level, allows the main counter to feed the image memory 8 with addresses.

A signal ④ is an image memory read/write control signal N for setting the image memory in the write mode at high level and the read mode at low level. A signal L is a clock and reset signal for the auxiliary address counter 23 and drives with a signal ⑥ the vertical counter and with a signal ⑳ the horizontal counter. In response to the signal SV, it also sets the respective counters at the initial value or 160. Similarly, a signal K is a clock and reset signal for the main address counter 22. In response to the switching signal W, the switch 38 switches the clock pulse from the horizontal counter to either a signal 10 of 5 MHz in the mode 1 or a signal ⑮ of 20/3 MHz in the mode 2. A signal ⑭ is a sampling clock T in the mode 2 and a load pulse signal O for the parallel/series conversion shift register 21. A signal ⑮ is a shift clock P to the shift register 20 for series/parallel conversion of the data from the image memory 8. A signal ⑩ is a reference clock or 5 MHz signal used as a shift clock Q for the shift register 21 and as a sampling clock U in the mode 1.

In operation, When the button 15 is pressed, the output H of the flip flop 10 is inverted to high level. In response to this high level signal, the read/write control signal N for the image memory 8 is turned to the W mode for one field interval (1V interval) based on the synchronizing signals SH and SV to the timing control circuit 25. That is, in FIG. 2, the signal H is fed to the data terminal D of the D flip flop 26 while the vertical synchronizing signal SV of the synchronizing signals SH and SV is fed to the clock terminal T so that the output Q and $\bar{Q}$ are turned to high and low levels, respectively, when the vertical synchronizing signal is received. The output $\bar{Q}$ is delayed in the delay circuit 26a so as to generate a trigger pulse at the output of the AND circuit 27. This trigger pulse sets the next RS flip flop 28 to bring its output $\bar{Q}$ to low level. The vertical synchronizing signal SV after one field resets the RS flip flop 28 to return its output to the original high level. The interval of the low $\bar{Q}$ output of the RS flip flop corresponds to the W mode for a still picture of the image memory 8 and brings the memory 8 to writing condition (hereinafter called "mode 1").

The image signal A from the image amplifying and demodulating circuit 2 (FIG. 6) is fed to the A/D converter 16 in FIG. 1. While the $\bar{Q}$ output of the RS flip flop 28 is at low level, the clock switch 19 is turned to the position 1 in response to the switch signal W for feeding the 5 MHz which is a division of the 20 MHz from the reference oscillator 18. Consequently, the digital image signal sampled in the first sampling mode at 5 MHz is fed to the image memory 8. At this time, the read/write main address counter 22 works as a write counter and writes the digital image signal E at 5 MHz in response to the clock signal K put into the counter input. When the $\bar{Q}$ output of the flip flop 28 is at low level, the switch signal M turns the address bus switch 24 to the position 1. In this way, the information about one field of TV image has been written in the image memory 8.

When the output of the flip flop 28 in FIG. 2 is turned to high level upon completion of the afore-mentioned writting operation, the memory 8 is turned to the R mode. If the address bus switch 24 remains at the position 1, the main address counter 22 reads the memory 8. The output F is then returned to an analog signal G by the D/A converter 9 to provide a still picture of the above pixels (hereinafter called "mode 2"). In accordance with the invention, after writing, the memory is periodically turned to the W mode in response to the signal N while the output of the auxiliary address counter 23 is fed to the memory 8 to control the mode 2 for simultaneouse reading and writing operations.

The address counters 22 and 23 will be described. In general, an address counter for an image memory is composed of a dot counter in the horizontal direction and a line counter in the vertical direction. These horizontal and vertical counters are driven by clock signals corresponding to a sampling clock and a horizontal synchronizing signal, respectively. The vertical synchronizing signal is used as a reset signal for resetting the counter in the initial state. These signals are indicated at K and L. In this embodiment, based on the afore-mentioned number of pixels, the main counter 22 is able to count up to 240 in both vertical and horizontal directions. The clock of the horizontal counter operates at 5 MHz in the mode 1. The main counter 22 is reset in response to the first vertical synchronizing signal in the mode 1. The horizontal counter is then driven by the 5 MHz clock to count up to 240, when the data of a single line are written in the area corresponding to the assigned column addresses of the memory 8. The horizontal counter is reset by the horizontal synchronizing signal while the vertical counter is raised one count to assign a row address. This cycle is repeated until the image data E with 240 pixels horizontally and 240 lines vertically are written in the column addresses 1 through 240 and row addresses 1 through 240 of the memory.

In the mode 2, the sampling clock switch 19 puts the second sampling mode clock of 5/3 MHz into the A/D converter 16. It is noted that the clock rate is one third of that of the mode 1. Consequently, the number of pixels in a horizontal line is one third of 240 or 80. A clock of 5/3 MHz repetition period is put into the auxiliary counter 23 for horizontal counter driving. If the horizontal counter initial set value of auxiliary counter 23 is 160, 80 pixels generated for one horizontal line are written in the row addresses 161 through 240. When a ⅓ demultiplied horizontal synchronizing signal is put into the auxiliary counter 23 for vertical counter driving, the number of lines in the vertical direction in one field is demultiplied to 80. Similarly, when the initial value of the vertical counter is set at 160, the data of 80 lines in the vertical direction are written in the row addresses 161 through 240 of the memory 8. The column and row addresses other than the column addresses 161 through 240 and the row addresses 161 through 240 remain in the original state.

The reading of the image memory in the mode 2 is carried out continuously by the main counter 22 while the afore-mentioned writing is not executed. This operation will be explained with reference to FIGS. 3 and 4, showing timing charts based on the horizontal synchronizing signal unit (1H time) and the dot clock unit in which the 1H interval is extended, respectively. In FIG. 3, the signal ④ is a read/write control signal N, and, in the mode 1, its output $\overline{Q}$ is turned to low level or the W mode by the flip flop 28. In the subsequent mode 2, as FIG. 4 shows, the signal ㉑ is turned to the W mode at a period of 5/3 MHz. The signal ⑤ is a clock K for vertical count by the main address counter 22 and assigns the write addresses (1 through 240) in the mode 1 and the read addresses (1 through 240) in the mode 2. The signal ⑥ is a clock for vertical count by the auxiliary address counter 23 in the mode 2 and assign the row addresses (161 through 240) for writing a motion picture in a period of 3H.

Referring to FIG. 4 showing the timing in dot clock units which are extended units of FIG. 3. The signal ⑩ is a 5 MHz reference clock and used as a sampling clock V for the A/D converter 16 and a horizontal counter clock K for the main address counter 22 in the mode 1 to assign the writing column addresses Z ⑪ (1 through 240) in the memory so that the digital image data E ⑫ (D 1 through D 240) of a horizontal line are written.

In the mode 2, the sampling clock V of the A/D converter 16 is turned to a signal ⑭ of 5/3 MHz so as to generate the digital image data E ⑰ (DW 1 through DW 80). The horizontal counter of the auxiliary counter 23 operates with a clock input L of the 5/3 MHz signal ⑳ to generate the write string address Y signal ㉑ (161 through 240) for writing the digital data E ⑰ (DW 1 through DW 80) in the memory. This signal ⑳ is also used as the read/write mode control signal N for the memory 8. That is, while this signal is at low level, writing in the memory is executed, whereas the memory is in the read mode during the other period. More specifically, reading from the memory 8 is executed in the first, second, and third periods of the signal ⑮ of 20/3 MHz while writing is executed in the fourth period. Since the signal switch 38 of FIG. 2 is on the side of the position 2 during the reading operation, the horizontal counter clock K of the main address counter 22 generates a string address signal X (1 through 240) in response to the repeated pulses ⑮ in the first through third period (excluding the broken line area) as the signal ⑯. Consequently, the data F read out of the memory has a data absent area as shown at the signal ⑱ and is put into the shift register 20 with the signal ⑮ as a shift clock P. The data are then loaded to the parallel/serial converter 21 with the signal ⑭ as a load pulse O, where they are converted to a serial data string signal ⑲ J with the shift clock Q of the 5 MHz signal ⑩ and fed to the D/A converter 9. The output of the D/A converter is fed to the CRT 13 to display a motion picture at a size of one ninth of the full screen along with a still picture. Since the initial values of both horizontal and vertical counters of the auxiliary counter 23 are set at 160, the motion picture is set in the lower right-hand corner of the screen as shown in FIG. 5. It is obvious that if both counters are set at 0, then the motion picture is set in the upper left-hand corner.

As has been described above, by the image processing method according to the invention, not only still pictures but also subsequent motion pictures can be displayed by sequentially writing in the specified area of a memory the image signals sampled with the number of pixels corresponding to the number of addresses in the specified area in the process of reading all the addresses of the memory.

According to another aspect of the invention there is provided an apparatus for processing an image of the type having an image memory and a display device for display the signal read out of said image memory, which comprises sampling means having a first sampling mode in which an image signal is sampled with the number of pixels corresponding to the number of all the addresses of said image memory and a second sampling mode in which an image signal is sampled with the number of pixels corresponding to the number of addresses in a specified area of said image memory; first addressing means for designating all the addresses of said image memory; second addressing means for designating the addresses in said specified area of said image memory; and control means for controlling said sampling means, first and second addressing means, and image memory, said control means adapted to set said sampling means at said first sampling mode and said image memory at the write mode and make said first addressing means designate all the addresses of said image memory for writing an image to provide a still picture, and then set said sampling means at the second sampling mode and make said second addressing means sequentially write said signal sampled to said specified area of said image memory to provide a motion picture, while it is adapted to set said iamge memory at the readout mode in the period other than said motion picture writing period and put said first addressing means in operation to read all the image memory contents including both still and motion pictures for display in said display device, thereby providing display of both still and subsequent motion pictures at the same time.

According to still another aspect of the invention there is provided an apparatus for processing an image further comprising a shift register in response to control of said control means to process the pixel data read out of said image memory and send its output to said display device. After all the memory contents including both still and motion pictures are read out of said image memory, the shift register eliminates the data absent area of the pixel data during the motion picture writing period for display in the display device so that motion pictures are displayed without any interruption.

What is claimed is:

1. Apparatus for processing an image of the type having an image memory and a display device for display the signal read out of said image memory, which comprises:
   sampling means having a first sampling mode in which an image signal is sampled with the number of pixels corresponding to the number of all the addresses of said image memory and a second sampling mode in which an image signal is sampled with the number of pixels corresponding to the number of addresses in a specified area of said image memory;
   first addressing means for designating all the addresses of said image memory;
   second addressing means for designating the addresses in said specified area of said image memory;
   control means for controlling said sampling means, first and second addressing means, and image memory, said control means adapted to set said sampling means in said first sampling mode and said image memory in the write mode and make said first addressing means designate all the addresses of said image memory for writing an image to provide a still picture, and then set said sampling means in the second sampling mode and make said second addressing means sequentially write said signal sampled to said specified area of said image memory to provide a motion picture, while it is adapted to set said image memory in the readout mode in the period other than said motion picture writing period and put said first addressing means in operation to read all the image memory contents including both still and motion pictures for display in said display device.

2. Apparatus for processing an image according to claim 1, wherein said first and second addressing means designate addresses in synchronism with the sampling period of said first and second sampling modes, respectively.

3. Apparatus for processing an image according to claim 1, wherein said first addressing means completes designating all the addresses in said second sampling mode before said second addressing means completes designating the addresses in said specified area.

4. Apparatus for processing an image according to claim 1, wherein said sampling means consists of an A/D converter.

5. Apparatus for processing an image of the type having an image memory and a display device for display the signal read out of said image memory, which comprises:
   sampling means having a first sampling mode in which an image signal is sampled with the number of pixels corresponding to the number of all the addresses of said image memory and a second sampling mode in which an image signal is sampled with the number of pixels corresponding to the number of addresses in a specified area of said image memory;
   first addressing means for designating all the addresses of said image memory;
   second addressing means for designating the addresses in said specified area of said image memory;
   shift register means for processing the pixel data read out of said image memory and sending its output to said display device; and
   control means for controlling said sampling means, first and second addressing means, and image memory, said control means adapted to set said sampling means in said first sampling mode and said image memory in the write mode and make said first addressing means designate all the addresses of said image memory for writing an image to provide a still picture, and then set said sampling means in the second sampling mode and make said second addressing means sequentially write said signal sampled to said specified area of said image memory to provide a motion picture, while it is adapted to set said image memory in the readout mode in the period other than said motion picture writing period and put said first addressing means in operation to read all the image memory contents including both still and motion pictures and make said shift register means eliminate the data absent area contained in said pixel data during said motion picture writing period for display in said display device.

* * * * *